United States Patent [19]
Ishikawa et al.

[11] Patent Number: 4,891,624
[45] Date of Patent: Jan. 2, 1990

[54] REARWARD VEHICLE OBSTRUCTION DETECTOR USING MODULATED LIGHT FROM THE BRAKE LIGHT ELEMENTS

[75] Inventors: Kiyomitsu Ishikawa, Tokyo; Tohru Tanabe; Shigeru Kimura, both of Yokohama; Kazuhiko Yamada, Kawasaki, all of Japan

[73] Assignee: Stanley Electric Co., Ltd., Tokyo, Japan

[21] Appl. No.: 174,773

[22] Filed: Mar. 29, 1988

[30] Foreign Application Priority Data

Jun. 12, 1987 [JP] Japan ................. 62-145330
Jun. 12, 1987 [JP] Japan ................. 62-145331
Jun. 12, 1987 [JP] Japan ................. 62-145332
Jun. 12, 1987 [JP] Japan ................. 62-145333

[51] Int. Cl.$^4$ ........................... B60Q 1/00
[52] U.S. Cl. ................... 340/436; 180/169; 356/3
[58] Field of Search ........... 340/52 H, 903, 904, 340/435, 436, 437; 250/215, 221, 222.1, 224, 239; 356/1, 3, 4, 4.5, 5, 9, 18; 307/10.8; 180/274, 167, 169

[56] References Cited

U.S. PATENT DOCUMENTS

| | | | |
|---|---|---|---|
| 3,601,792 | 8/1971 | Murray | 340/903 |
| 3,604,805 | 9/1971 | Scott | 356/5 |
| 3,790,780 | 2/1974 | Helmcke et al. | 340/903 |
| 3,950,098 | 4/1976 | Caine | 356/3 |
| 4,278,962 | 7/1981 | Lin | 340/52 H |
| 4,467,313 | 8/1984 | Yoshino et al. | 340/904 |
| 4,528,563 | 7/1985 | Takeuchi | 340/903 |

FOREIGN PATENT DOCUMENTS

| | | | |
|---|---|---|---|
| 2248515 | 10/1973 | France | 340/52 H |
| 4889370 | 12/1972 | United Kingdom | 340/52 H |

*Primary Examiner*—Herbert Goldstein
*Assistant Examiner*—Jill D. Jackson
*Attorney, Agent, or Firm*—Brumbaugh, Graves, Donohue & Raymond

[57] ABSTRACT

The detection system for obstruction to vehicle according to the invention comprises a plurality of light emitting elements disposed in the rear of a car, a modulation for emitting modulation lights from the light emitting elements, light receiving elements for receiving the reflected light that the modulation light comes in contact with an external obstruction to reflection, a detection circuit for detecting output signals of the light receiving elements, thus detecting the obstruction from an output of the detection circuit, and a rearward obstruction can be detected securely particularly when the car moves backward, a new light source for obstruction detecting is not particularly required, and thus no area must be prepared for installation.

14 Claims, 6 Drawing Sheets

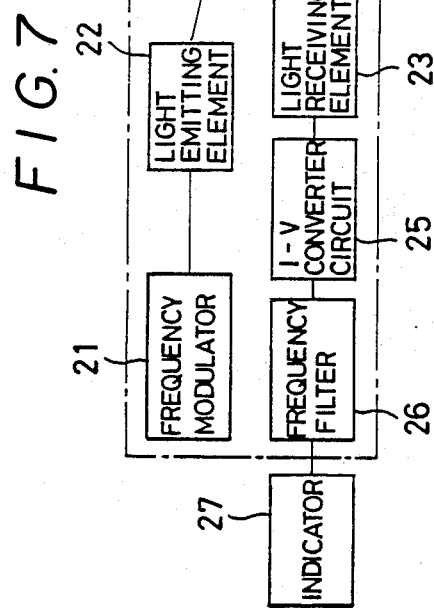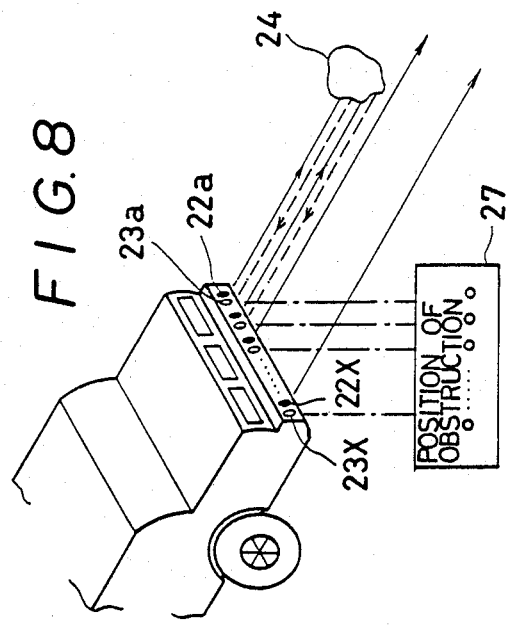

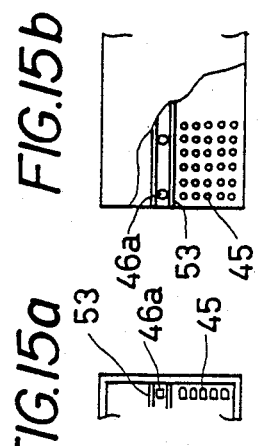
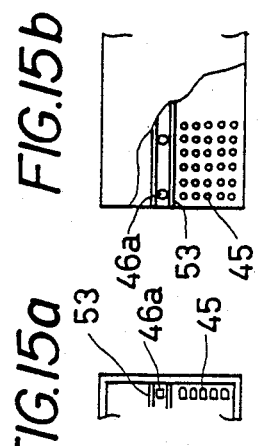
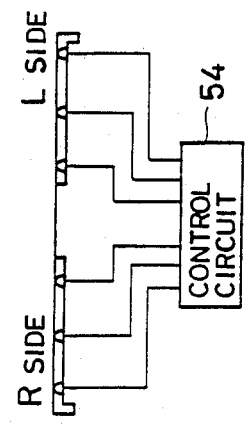
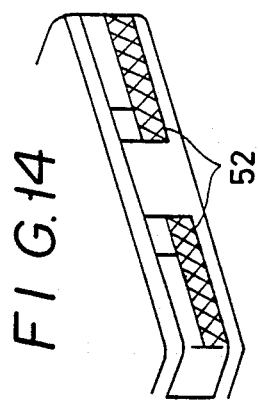
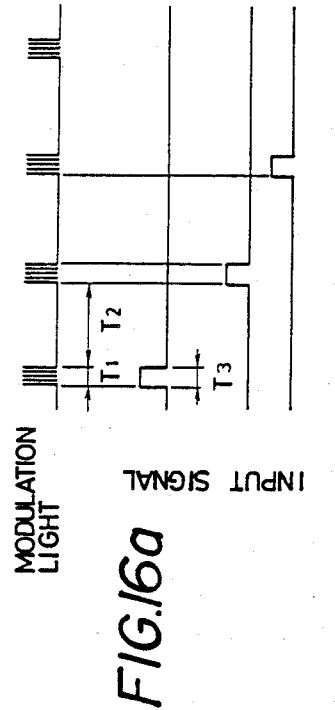
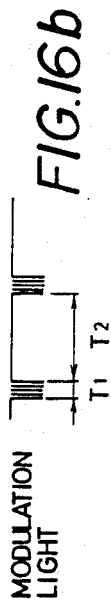

REARWARD VEHICLE OBSTRUCTION DETECTOR USING MODULATED LIGHT FROM THE BRAKE LIGHT ELEMENTS

BACKGROUND OF THE INVENTION

1. Field of the Invention

The present invention relates to a detection system for obstruction particularly rearward of an automobile by means of a modulation light.

2. Description of the Prior Art

For detection of a rearward obstruction in an automobile or the like, a detection system shown, for example, in FIG. 1 is known well. The system comprises embedding a conductor 3 as a sensor in a rear bumper 2 of an automobile 1, detecting a change in electrostatic capacity (C) generated between the conductor 3 and an obstruction 4 in the form of a change in voltage value, thus detecting a presence of the obstruction 4 from the detected value. FIG. 2 is an equivalent circuit diagram thereof, wherein a voltage (V) coming out on an output terminal 6 from a power source 5 through a resistance (R) is changed according to the aforementioned electrostatic capacity (C), and thus a presence of the obstruction 4 can be known by detecting the voltage (V).

However, in the above-described detection system, since the electrostatic capacity (C) between the conductor 3 or a sensor and the obstruction 4 reacting thereto is simply detected, there may be a case where presence and position of the obstruction cannot securely be detected, and further the conductor is made to work as a sensor, it is easy to receive an influence of electromagnetic noise.

SUMMARY OF THE INVENTION

The invention has been done in view of the problems mentioned above, and its object is to provide a detection system for obstruction to vehicle which is capable of detecting securely the presence and the position of an obstruction and free from an influence of electromagnetic noise.

The invention comprises providing a plurality of light emitting elements in the rear of a car, a modulator for emitting modulation lights from the light emitting elements, light receiving elements for receiving reflected lights that the modulation lights once come in contact with an external obstruction and then reflect, a detection circuit for detecting output signals of the light receiving elements, thus detecting an obstruction from an output of the detection circuit.

Then, in a detection system for obstruction to vehicle from utilizing the reflection light being incident on light receiving elements when a detecting modulation light emitted from light emitting elements comes in contact with an obstruction to reflection, the invention comprises providing the light emitting elements and the light receiving elements integrally with a rear combination lamp, disposing the light emitting elements on a corner portion of the rear combination, disposing the light receiving elements on both sides thereof.

Further, the invention comprises an output driving circuit for emitting modulation light of a constant period from light emitting elements provided in the rear of a car, light receiving elements for receiving a reflection light when the modulation light reflects on an obstruction, a tuning circuit for extracting a signal of the aforementioned constant period from outputs of the light receiving elements, an arithmetic circuit for inputting the extracted signal in the constant period and computing a position of the obstruction from a level of the inputted signal.

BRIEF DESCRIPTION OF THE DRAWINGS

FIG. 7 is a block diagram showing a schematic construction of a second embodiment of the invention;

FIG. 8 is a block diagram showing the rear of an automobile to which a system of FIG. 7 is applied;

FIG. 14 is an outline drawing of a rear combination lamp provided with LED and light receiving elements of FIG. 13;

FIGS. 15 (a) and (b) are block diagrams showing a disposition example of LED and light receiving elements;

FIGS. 16 (a) and (b) are timecharts indicating operations of a circuit of FIG. 13;

FIG. 17 is an explanatory drawing showing an example wherein left and right rear combination lamps are driven by the same control circuit.

DETAILED DESCRIPTION OF PREFERRED EMBODIMENTS

Figure 1:
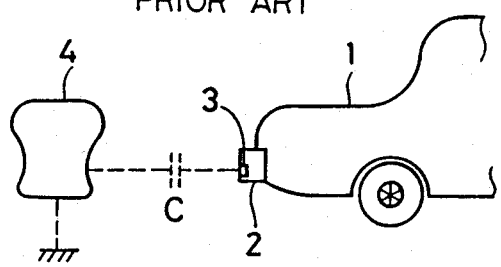
FIG. 1 is a block diagram representing one example of a prior art detection system for obstruction to vehicle.
Figure 2:
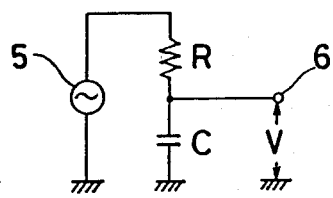
FIG. 2 is an equivalement circuit diagram of a circuit configuration of FIG. 1.
Figure 3:
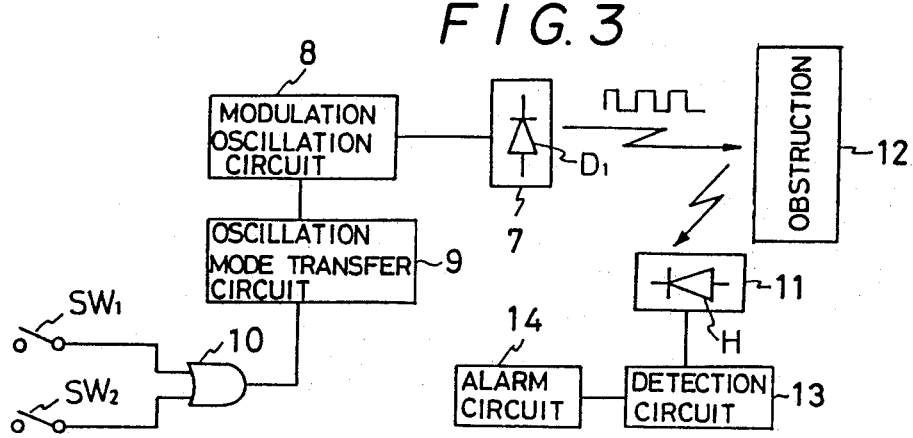
FIG. 3 is a block diagram representing a first embodiment of the invention.

FIG. 3 is a block diagram representing a first embodiment of the invention, wherein 7 denotes a stop lamp and a tail lamp formed of LED (light emitting diode) $D_1$ or a plurality of light emitting elements, 8 denotes a modulation oscillator circuit for lighting up the stop lamp and tail lamp 7, and each LED $D_1$ emits a modulation light for obstruction detecting. A reference numeral 9 denotes an oscillation mode transfer circuit for transferring an oscillation mode of LED, and signals from a brake switch $SW_1$ and a light switch $SW_2$ are inputted thereto through OR circuit 10. A reference numeral 11 denotes a light receiving part provided with a photosensor (light receiving element) H for receiving the modulation light from LED $D_1$ of the stop lamp and tail lamp 7 which comes in contact with and reflects from an obstruction 12, 13 denotes a detection circuit for detecting an output signal of the photosensor H, 14 denotes an alarm circuit actuated on an output of the detection circuit 13, alarming a driver (operator) whenever a presence of the obstruction is detected.

Figure 4:
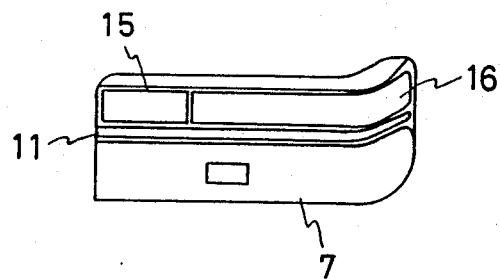
FIG. 4 is a perspective view showing outlines of a rear combination lamp.

FIG. 4 is a perspective view showing an outline of a rear combination lamp provided with the above-described detection system. As illustrated, the stop lamp and tail lamp 7 and the light receiving part 11 are unified and so provided with other back lamp 15 and turn signal lamp 16. In the drawing, while the rear combination lamp on R (right) side only is indicated, the rear combination lamp on L (left) side is constituted symmetrically likewise.

Figure 5:
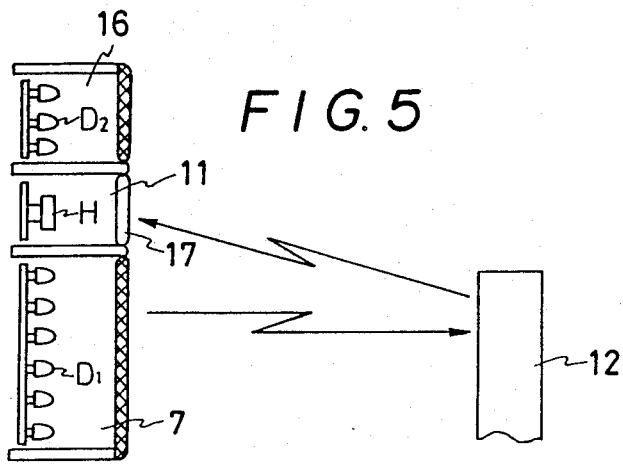
FIG. 5 is a drawing showing an internal structure in section thereof.

Then, FIG. 5 shows a structure in section of the rear combination lamp of FIG. 4, wherein a clear receiving window 17 is provided partly on the light receiving part 11, and the photosensor H is arrayed plurally in line or in area. Then, a turn signal lamp 16 is also formed of a plurality of LED $D_1$.

In the detection system constructed as above, when the stop lamp lights up, i.e. at the time of operating the brake pedal, or at the time of operating a manual switch, a modulation light constant in frequency is emitted rearward from LED $D_1$. In this case, where there is no obstruction 12 present rearward, a reflected light does not come into the photosensor H of the light receiving part 11, therefore nothing is generated from the detection circuit 13. However, if there is the obstruct 12 present rearward, then the reflected light comes into the photosensor H, and a signal synchronized with the frequency of oscillation is generated from the detection circuit 13. Then, the alarm circuit 14 is actuated on an output signal of the detection circuit 13, thus alarming a driver visually or aurally.

Figure 6:
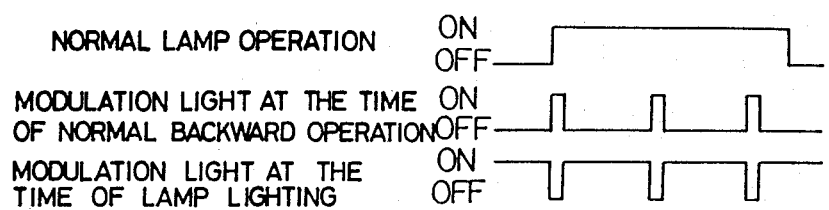
FIG. 6 is a drawing showing output waveforms at the time of normal lamp operation and modulation light.

FIG. 6 shows output waveforms of stop lamp and tail lamp in normal operation and of modulation light. As illustrated, a lighting of the stop lamp and a lighting of the tail lamp are binary in ON/OFF. Now, therefore, the modulation oscillation circuit 8 causes a long modulation light emitting duty cycle when measured by the length of time the modulated light is not emitted during normal backward operation, and also causes a long modulation light emitting duty cycle when measured by the length of time the modulated light is emitted during the time of lighting of the stop lamp and the tail lamp. Thus, the state will not be taken as lighting to the naked eye by the modulation light when the stop lamp and the tail lamp are not lighted up, and also the state will be taken as lighting normally thereto when the stop lamp or the tail lamp is lighted up at the time of backward operation.

As described, a presence of the obstruction 12 is detected securely beforehand by the modulation light free from influence of a disturbance light, however, since the modulation light for obstruction detecting is emitted from LED of the stop lamp or the tail lamp here, a particular light source will not be required newly therefor, and a mounting area is not necessary accordingly. Further, a lighting period of the modulation lights emitted from the lamps on R and L sides will be changed, and thus an output ratio between the photosensors H on R and L sides to a light emission from L side and an output ratio to a light emission from R side are compared, thereby detecting a distance to the obstruction 12 and its position.

Then, the photosensor H of the light receiving part 11 may be single or plural, however, an array in line or area plurally may be advantageous to a comparison of the reflected lights and thus is to ensure accuracy. Further, the modulation light may be emitted selectively when backward operation is detected from shift lever position, gear position and so forth, which is effective in observing that the following car comes near to even at normal driving.

FIG. 7 is a block diagram showing the construction of a second embodiment of the invention. In the drawing, 21 denotes a frequency modulator for making light emitting elements 22 such as a plurality of light emitting diodes and the like to emit modulation lights with different frequency each, 23 denotes light receiving elements such as a plurality of photodiodes and the like which are provided correspondingly to each light emitting element 22, receiving the light that each modulation light comes in contact with an obstruction 24 and so reflects. A reference numeral 25 denotes I to V converter circuit for converting an output of the light receiving element 23, or a current (I) of an electrical signal converted photoelectrically into a voltage (V), 26 denotes a frequency filter for detecting only a signal of specific (self) modulation frequency from the signal I-to-V-converted, these being provided correspondingly to each light receiving element 23. A reference numeral 27 denotes an indicator for indicating a position of the obstruction 24 from each detected frequency signal.

The detection system constructed as above is preferable for detecting obstructions rearward of an automobile as shown in FIG. 8, and in this case, a rear bumper of the automobile has a sensing structure installing plurally a module with a plurality of light emitting elements 22a, 22b, ... 22x and light receiving elements 23a, 23b, ... 23x paired therefor, namely a light emitting-/receiving module consisting of a light emitting part having different modulation frequencies and a light receiving part for detecting only the modulation frequencies. Then, the modulation light coming out of the light emitting part makes an irregular reflection on the surface of the obstruction 24, if present, and returns to each light receiving element 23. In this case, the reflected light having thus returned reaches each light receiving element, however, as having the frequency modulated, a position of the light receiving element 23 capable of detecting the frequency comes to a position of the rearward obstruction 24, and thus the position can be indicated on the indicator 27. In this case, a current of each light receiving element 23 is converted into a voltage as described, and information is provided to a driver through the indicator 27.

Thus, the obstruction rearward of the automobile can be detected securely, and if such obstruction is present plurally, the position (distance) can be detected, and a use of the modulation light may keep the system free from influence such as electromagnetic noise or the like. Further, since there is no moving part provided, a long lifetime and a high reliability will be ensured, and a detection speed is also very high.

Figure 9:
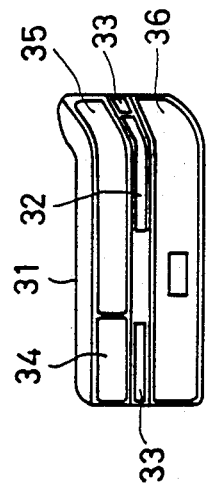
FIG. 9 is a block diagram representing a third embodiment of the invention.

FIG. 9 is a block diagram representing a third embodiment of the invention, showing an outline of a rear combination lamp 31. A light emitting element for emitting an obstruction detecting infrared modulation light and a light receiving element on which the reflected light is incident are provided integrally on the rear combination lamp 31. That is, a light emitting part 32 having the light emitting elements and light receiving parts 33 coming on both sides thereof and having the light receiving elements are provided integrally between a back lamp 34, a turn signal lamp 35 and a stop-/tail lamp 36.

Figure 10:
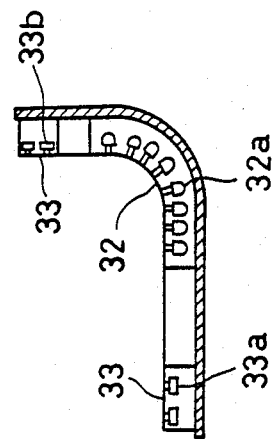
FIG. 10 is a sectional view showing a light emitting part and a light receiving part of FIG. 9 in detail.

FIG. 10 shows an internal construction of the light emitting part 32 and the light receiving parts 33. The light emitting part 32 is positioned at a corner portion of the rear combination lamp 31, a plurality of light emitting diodes are disposed as light emitting elements 32a therein, while the light receiving parts 33 are positioned on both sides of the light emitting part 32, and a plurality of light receiving elements 33a, 33b such as photodiodes or the like are disposed therein. Then, the illustration indicates only the right side, however, the left side is also the same in construction symmetrically.

Figure 11:
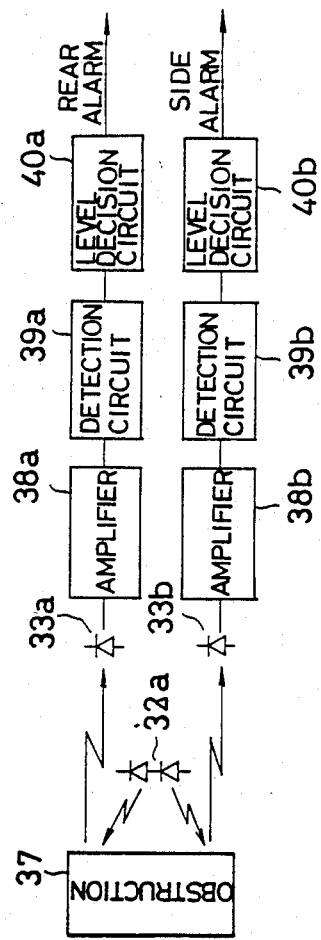
FIG. 11 is a block diagram showing a signal processing system.
Figure 12:
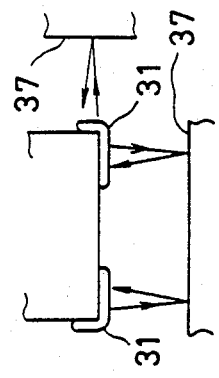
FIG. 12 is an explanatory drawing showing the look of emission and incidence of modulation lights.

In the detection system constructed as above, a constant modulation light is emitted from each light emitting element 32a rearward and sideways of a car automatically or manually at the time of backward operation of the car. Then, there is a wall provided between the light emitting part 32 and the light receiving parts 33 so as not to allow the modulation light to be incident directly on the light receiving elements 33a, 33b in this case. If the modulation light comes in contact with an obstruction 37, then the reflected light is incident on the light receiving elements 33a, 33b each. As illustrated in FIG. 11, the incident light is converted into an electrical signal, amplified by amplifiers 38a, 38b, then fed to detection circuits 39a, 39b, further fed to level decision circuits 40a, 40b, and thus a distance to the obstruction 37 is detected. That is, if the distance to the obstruction 37 becomes shorter, a signal with gradually large amplitude will be detected. In this case, modulation lights are emitted from both the left and right rear combination lamps 31, therefore a driver can also be advised of the direction in which the obstruction 37 is present. FIG. 12 shows a state wherein modulation light is emitted and incident.

Thus, the obstruction 37 present rearward and sideways of a car can be detected effectively, and the driver can be advised of the position and direction thereof. Since the modulation light is received and emitted on infrared rays in this case, noise is capable of exerting an influence less thereon, and a use of visible light cut lens will be effective in concealing a presence of the system without marring the surface appearance.

Then, the obstruction may be detected not only at the time of backward operation but also during a drive. In respect further of energy saving and prevention of erroneous alarming, it is desirable that a detection operation be commenced after ensuring shift lever position, back lamp lighting and necessary others.

Figure 13:
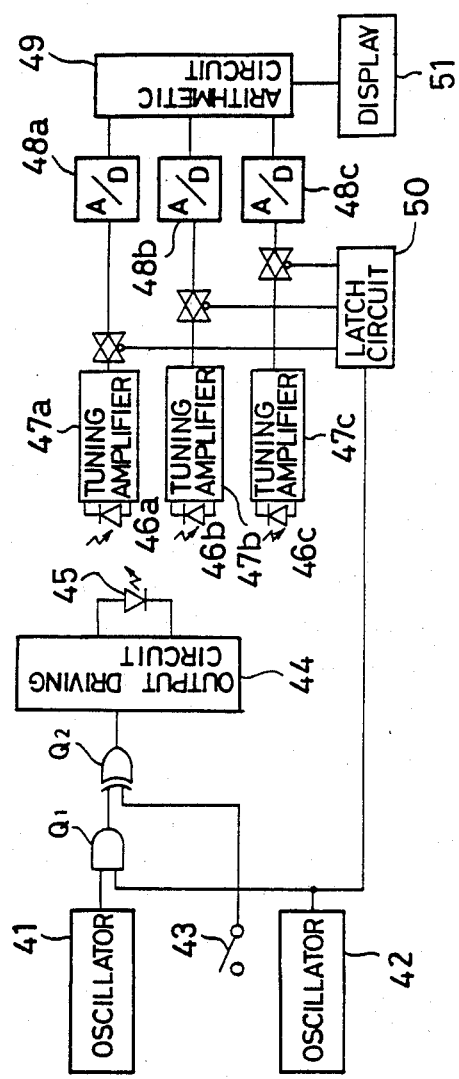
FIG. 13 is a block diagram representing a fourth embodiment of the invention.

FIG. 13 is a block diagram showing a circuit configuration of a fourth embodiment of the invention. In the drawing, 41, 42 denote oscillators having oscillation frequencies $f_0$, $f_1$ respectively, $Q_1$, $Q_2$ denote AND circuit and XOR circuit, AND circuit $Q_1$ inputting outputs of the oscillators 41, 42, XOR circuit $Q_2$ inputting an output of AND circuit $Q_1$ and a signal from a lighting switch 43. A reference numeral 44 denotes an output driving circuit for making LED (light emitting diode) 45 emit modulation light of a constant period according to an output of XOR circuit $Q_2$, 46a, 46b, 46c denote light receiving elements for receiving the light that the modulation light is reflected on an obstruction (not indicated), 47a, 47b, 47c denote tuning amplifiers for extracting the signal of a constant period to amplification from outputs of the light receiving elements 46a, 46b, 46c, 48a, 48b, 48c denote A/D converters for subjecting the amplified signal to A/D (analog/digital) conversion to inputting to an arithmetic circuit 49, and signals from the light receiving elements 46a, 46b, 46c are loaded in the arithmetic circuit 49 in sequence at every constant periods by a latch circuit 50, levels of the signals are compared in the arithmetic circuit 49, and thus the position of an obstruction is computed. A reference numeral 51 denotes an alarm indicator circuit for indicating an alarm when the obstruction is detected. Then, in the drawing, while the light receiving elements 46a, 46b, 46c are indicated three only, the light receiving elements are arrayed in multiplicity practically, and LED 45 is also disposed in multiplicity.

FIG. 14 is an outline drawing of an automobile rear combination lamp provided with a light emitting part and a light receiving part having the aforementioned LED 45 and light receiving elements 46a to 46c. LED 45 works at the same time as LED forming stop/tail lamps 52. Then, FIGS. 15(a), (b) show examples of disposition of LED 45 and light receiving elements 46a to 46c, wherein LED 45 is disposed in plane in multiplicity, while the light receiving elements 46a to 46c are disposed linearly at regular intervals. Then, a douser 53 is provided between both the two so as not to allow modulation light of LED 45 to be incident directly on the light receiving elements 46a to 46c.

Next, an action will be described by means of a timing chart of FIG. 16. FIG. 16 shows waveforms of modulation light from LED 45 and signals inputted to the arithmetic circuit 49 from the light receiving elements 46a to 46c each.

As described hereinbefore, the oscillators 41, 42 have oscillation frequencies $f_0$, $f_1$ each, of which the oscillator 42 oscillates at a period T ($T = T_1 + T_2$) and a duty cycle ratio $T_1/T$. The two oscillation signals are mixed in AND circuit $Q_1$ and inputted to one terminal of XOR circuit $Q_2$. A signal from a mode transfer lighting switch 43 is inputted to the other terminal of XOR circuit $Q_2$. Then, an output signal of XOR circuit $Q_2$ is inputted to the output driving circuit 44, and LED 45 of the stop/tail lamps 52 is flickered by the output driving circuit 44. That is, LED 45 flickers a signal of the carrier frequency $f_0$ on the signal modulated by a continuous pulse signal having widths $T_1$, $T_2$, and emits the modulation light for obstruction detecting rearward of a car. In this case, the mode is transferred for daytime and nighttime by the lighting switch 43, thus changing a flickering state of LED 45. That is, during daytime, ON (lighting) time $T_1$ is made sufficiently shorter than OFF (extinction) time $T_2$ ($T_1 \ll T_2$) as shown in FIG. 16(a), thereby keeping the lighting of LED 45 from being recognized with the naked eye, and during nighttime, ON time $T_1$ is made sufficiently longer than OFF time $T_2$ ($T_1 \gg T_2$) as shown in FIG. 16 (b), thereby keeping the deterioration in luminous intensity of the stop/tail lamps 52 from being recognized.

On the other hand, the light receiving elements 46a to 46c are turned successively to ON state synchronously with the signal of period T, and the ON time $T_3$ is set properly in the range of period T ($T_3 \leq T$). Then, when modulation light from LED 45 comes in contact with an obstruction present rearward of a car, it reflects irregularly, and the reflected light is incident on the light receiving elements 46a to 46c. Each of the light receiving elements 46a to 46c converts the incident light into electrical signal, and the tuning amplifiers 47a to 47c detect and amplify only the signal of the same frequency $f_0$ as a light emitting signal of LED 45 out of those electrical signals, thus converting into DC level signal. In this case, the latch circuit 50 turns outputs of the tuning amplifiers 47a to 47c to ON/OFF successively synchronously with a signal (period T) of the oscillator 42, and the DC level signal (optical level signal) controlled by the latch circuit 50 is converted into a digital signal according to the level by A/D converts 48a to 48c, and inputted to the arithmetic circuit 49 from each port.

The arithmetic circuit 49 computes presence, distance, position (direction) of an obstruction or reflected matter from the digital signal inputted from A/D converters 48a to 48c, namely the level of reflected light incident on the light receiving elements 46a to 46c each, giving an alarm to a driver by sound or indicating position, distance and so forth on a board of the indicator circuit 51. In this case, levels of each light receiving signal are compared, thereby detecting position of the obstruction more accurately.

In the above-described embodiment, meanwhile, since a light source (LED 45) for the stop/tail lamps 52 works on a light emitting element, a space for installation can be minimized, and a large quantity of light is obtainable at moderate cost. Then, LED 45 can be driven all on the same signal, therefore the output driving circuit 44 may be given in a simple circuit configuration.

Then, as shown in FIG. 17, the rear combination lamps on R (right) side and L (left) side may be driven by the same control circuit 54 using CPU and others. Further, there may be a case where the quantity of light received varies somewhat according to a position of the light receiving elements 46a to 46c, therefore it is desirable that the position of an obstruction be computed through correction by the arithmetic circuit 49 at every elements.

As described above, according to the invention, an obstruction is detected by extracting an original modulation signal from output of a light receiving element on which a reflected light from the obstruction is incident, therefore presence and position of the obstruction can be detected accurately, and an electromagnetic noise is nothing serious to exert an influence thereon.

What is claimed is:

1. A detection system for detecting obstructions to a vehicle comprising: a plurality of light emitting elements which also operate as stop signal lamps or tail lamps disposed in the rear of the vehicle, a modulator which causes the light emitting elements to emit modulated light, a plurality of light receiving elements for receiving the modulated light that is transmitted and reflected off an external obstruction, a detection circuit which determines the presence of obstructions and produces an output signal indicating that an obstruction is detected.

2. The detection system for obstruction to vehicle as defined in claim 1 wherein the light receiving elements are integrally located with a set of rear combination lamps each equipped with the stop signal lamp and the tail lamp.

3. A detection system for detecting obstructions to a vehicle, provided with a plurality of light emitting elements disposed in the rear of the vehicle, a modulator which causes the light emitting elements to emit modulated light, a plurality of light receiving elements for receiving the reflected light that is transmitted once the modulated light comes into contact with an external obstruction, a detection circuit for detecting output signals transmitted by the light receiving elements, which is characterized in that an obstruction is detected from the output signal of the detection circuit, wherein the modulated causes the light emitting elements to emit a modulated light with a short light emitting duty cycle, compared to the length of time light is not emitted, during normal backward operation; and a long light emitting duty cycle, compared to the length of time light is not emitted, during the time of lightning of the stop signal lamp and tail lamp.

4. The detection system for obstruction to vehicle as defined in claims 1 or 3 wherein the modulated light is emitted only during backward operation.

5. The detection system for detecting obstructions to a vehicle as defined in any of claims 1 or 3 wherein the modulator makes each light emitting element emit a modulated light of different frequency.

6. In a detection system for obstructions to a vehicle, operating on a phenomenon that reflected light is incident on light receiving elements when a detecting modulated light emitted from light emitting elements come in contact with an obstruction which reflects the modulated light, the improvement characterized in that said light emitting elements and light receiving elements are integrally located within a set of rear combination lamps, the light emitting elements are disposed at the bent corner portions of the rear combination lamps, while the light receiving elements are disposed on both end sides of the rear combination lamps.

7. The detection system for detecting obstructions to a vehicle as defined in claim 6, wherein the detecting modulated light has a short light emitting duty cycle, compared to the length of time light is not emitted, during the time of normal backward operation; and a long light emitting duty cycle, compared to the length of time light is not emitted, during the time of lighting of the stop signal lamp and tail lamp.

8. The detection system for detecting obstructions to a vehicle as defined in claim 6, wherein the modulated light is emitted only during backward operation.

9. A detection system for detecting obstructions to a vehicle, comprising an output driving circuit for emitting a modulated light of constant period from light emitting elements acting as the stop signal lamps or tail lamps provided in the rear of a car, light receiving elements for receiving the reflected light when the modulated light is reflected off an obstruction, tuning circuits for extracting signals of said constant period from outputs each of the light receiving elements, an arithmetic circuit for inputting the extracted signals of said constant period and computing a position of the obstruction from the level of the extracted signals.

10. The detection system for detecting obstructions to a vehicle as defined in claim 9, wherein the output driving circuit produces a short modulated light emitting duty cycle, compared to the length of time light is not emitted, during the time of normal backward operation; and a long light emitting duty cycle, compared to the length of time light is not emitted, during the time of lighting of the stop signal lamp and tail lamp.

11. The detection system for detecting obstructions to a vehicle as defined in claim 9, wherein the modulated light is emitted only during backward operation.

12. The detection system for detecting obstructions to a vehicle as define in claim 9, wherein the arithmetic circuit processes signals of constant period, received from each of the tuning circuits, said extracted signals being amplified and transmitted synchronously with said modulated light of constant period, wherein levels of the extracted signals are compared by arithmetic operation to determine the position of the obstruction.

13. The detection system for detecting obstructions to a vehicle as defined in claim 9, wherein when the quantity of light received at each light receiving element varies, the arithmetic circuit computes the position of the obstruction by correcting the extracted signals for variations in the quantity of light received at each of the light receiving elements.

14. The detection system for detecting obstructions to a vehicle as defined in any of claims 9 through 13, wherein the light emitting elements and the light receiving elements are provided integrally on the rear combination lamp.

* * * * *